United States Patent [19]
Guliani et al.

[11] 3,993,898
[45] Nov. 23, 1976

[54] PRESS BRAKE PERFORMANCE TESTER

[75] Inventors: Surinder Singh Guliani, Springdale, Ark.; John David Petit, North Perry; John Francis Sawdy, Madison, both of Ohio

[73] Assignee: Babcock & Wilcox Limited, New York, N.Y.

[22] Filed: Dec. 17, 1975

[21] Appl. No.: 641,860

[52] U.S. Cl. ............................ 250/215; 250/231 R; 250/234
[51] Int. Cl.² ..................... H01J 39/12; G01D 5/34
[58] Field of Search ........... 250/234, 231, 215, 552; 324/186; 350/299

[56] References Cited
UNITED STATES PATENTS 3,025,406  3/1962  Stewart et al. ..................... 350/299
3,842,347  10/1974  Terbrack ............................ 324/186

Primary Examiner—Davis L. Willis
Assistant Examiner—David K. Moore
Attorney, Agent, or Firm—Vytas R. Matas; Joseph M. Maguire

[57] ABSTRACT

A portable self-contained testing apparatus is provided for accurately determining the stopping time of a press after the initiating of a STOP signal. The apparatus includes a detector head, a stationary grid, a synchronizing touch switch, and a control box with a digital readout. The detector head is mounted on the press ram to be movable therewith while the stationary grid member is mounted proximate to the detector to allow the detector to scan the grid lines on the grid as the ram moves. The touch switch is used to initiate the press STOP control signal and provides a signal to the control box to initiate grid count by the detector head whenever the press STOP signal is initiated through the touch switch. The control box has circuitry to convert the grid count signals from the detector head and the press STOP signals from the touch switch to a digital readout of the time required for the press to actually stop after the initiation of the press STOP signal.

9 Claims, 4 Drawing Figures

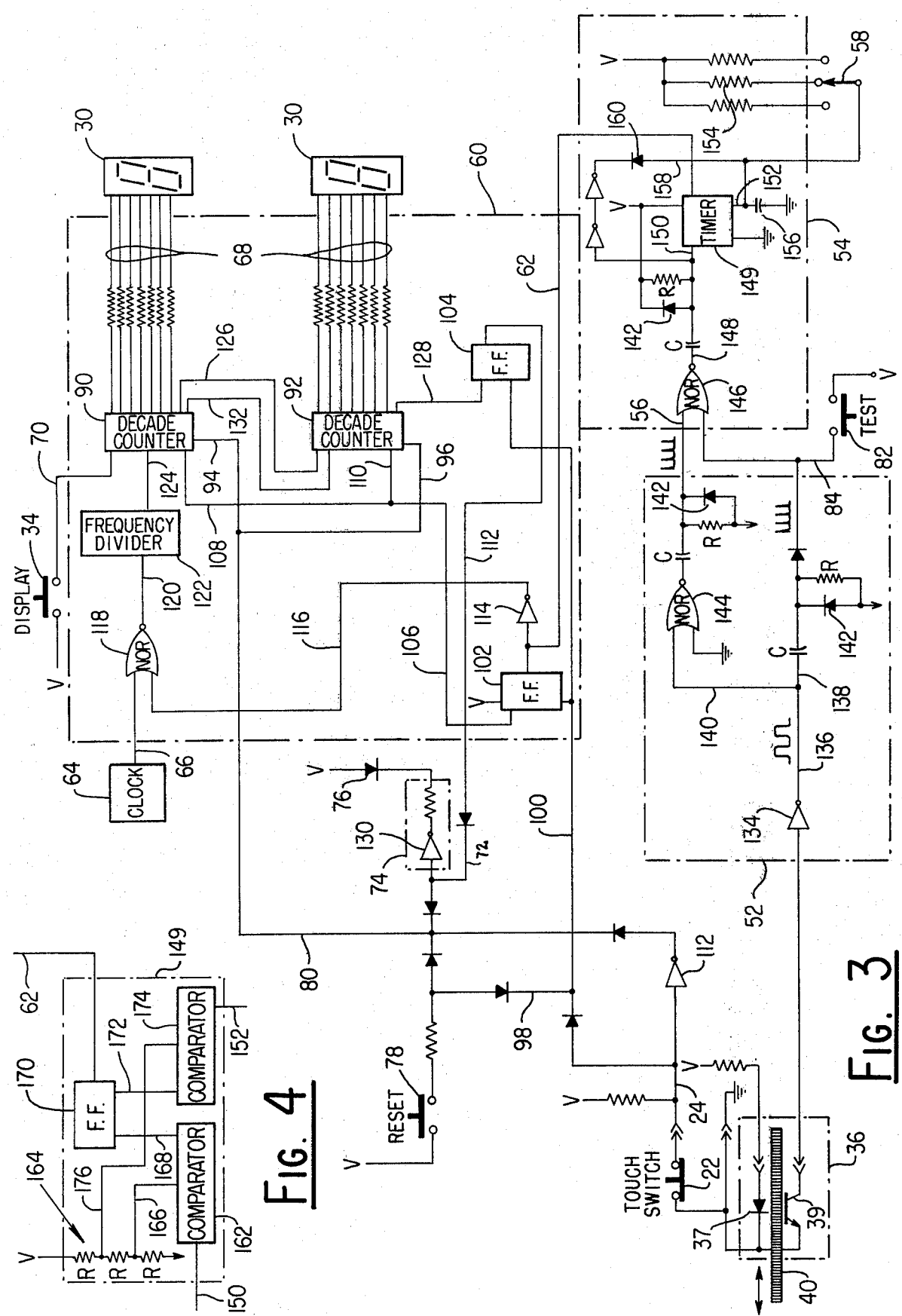

PRESS BRAKE PERFORMANCE TESTER

BACKGROUND OF THE INVENTION

1. Field of the Invention

The present invention relates to testing instruments generally and particularly to photoelectric testing instruments for determining stopping times of movable members such as press rams.

2. Description of the Prior Art

Operators of presses with part-revolution clutches are protected by two-hand controls or by presence-sensing devices such as light curtains. When two-hand controls are used, a press STOP signal is initiated whenever the operator releases pressure on one or both press RUN buttons. When a light curtain is used, a press STOP signal is initiated whenever the operator interrupts the light beam protecting the press. The degree of operator protection afforded by two-hand controls and light curtains depends mainly on the speedy performance of the press brake and on the distance the RUN buttons or light curtain is located from the press pinch points such as the ram and die. When an operator initiates a press STOP signal by releasing pressure on one of the RUN buttons or by interrupting the light curtain and moves his hands towards the die, the press brake must stop the press ram before the press operator's hands reach the point of operation or any dangerous press die closure area.

Current OSHA press safety standards require that a minimum safe distance be established between operating buttons and press closure areas when two-hand controls and presence-sensing devices are used. The minimum safe distance for the location of two-hand controls and presence-sensing devices is calculated using the operator's hand speed and the speed with which the press ram is brought to a full stop by the brake after a press STOP signal is initiated. The OSHA standards also require that brake performance — the ability of the press brake to bring the slide to a full stop within the forementioned time used in estabishing the minimum safe distance — be checked weekly unless the press has a built-in brake performance monitoring system.

Known devices for performing such required press stop time testing included visually timing the press ram motion after the initiation of a STOP signal. Clearly such a method is highly inaccurate and subjective. Mechanical devices are also known wherein a moving slide is wired into the press control circuitry to initiate and stop a timer to thereby measure stopping times. Such systems require time expenditure to properly connect them to the press circuitry. In such systems there is also the danger that upon removal of the testing system the press circuitry will be left in a dangerous or inoperative condition.

SUMMARY OF THE INVENTION

The present invention solves the aforementioned problems associated with the known prior art devices as well as other problems by providing a portable self-contained testing unit which quickly, easily, and accurately measures press stopping times. The testing unit provides a photoelectric detector assembly which is easily mounted to the press ram and which generates a pulse train having a frequency proportional to the speed of the press ram. The detector assembly is electrically connected to an electrical circuit contained within a self-powered portable container. The circuit includes a pulse detecting sub-circuit which compares the pulses from the detector assembly with a selectively set time interval and establishes a control to a digital counting and readout sub-circuit indicative of the speed with which the ram of the press is moving. The scanning and readout sub-circuit is also responsive to a touch switch actuates the press controls to establish control signals indicating a STOP command has been initiated to the press. When the readout sub-circuit receives the control signal from the touch switch that the STOP command has been initiated a count is begun in the counting amd readout sub-circuit which terminates only upon the receipt of a stationary press ram condition from the pulse detecting sub-circuit. This stored count is displayed on a digital readout mounted externally of the container which indicates the stored count as the time required to stop the press.

In view of the foregoing it will be seen that the one aspect of the present invention is to provide a portable, self-contained unit for detecting and indicating press stopping times.

Another aspect of the present invention is to provide a photoelectric detector assembly easily mountable to the press to provide an electrical pulse train having a frequency indicative of a speed of the press ram.

Yet another aspect of the present invention is to provide a touch switch for accurately sensing the initiation of a STOP command to the press.

Yet still another aspect of the present invention is to provide a circuit which will initiate a count upon the initiation of a STOP command to the press and end the count when the press ram comes to a stop after the initiation of the STOP command.

These and other aspects of the present invention will be more fully understood after consideration of the following description of the preferred embodiment and the associated drawings.

BRIEF DESCRIPTION OF THE DRAWINGS

FIG. 3 is a schematic of the electrical circuitry of the testing unit of FIG. 2.

FIG. 4 is a detailed block diagram of the timer of the FIG. 3 circuitry.

DESCRIPTION OF THE PREFERRED EMBODIMENT

Figure 1:
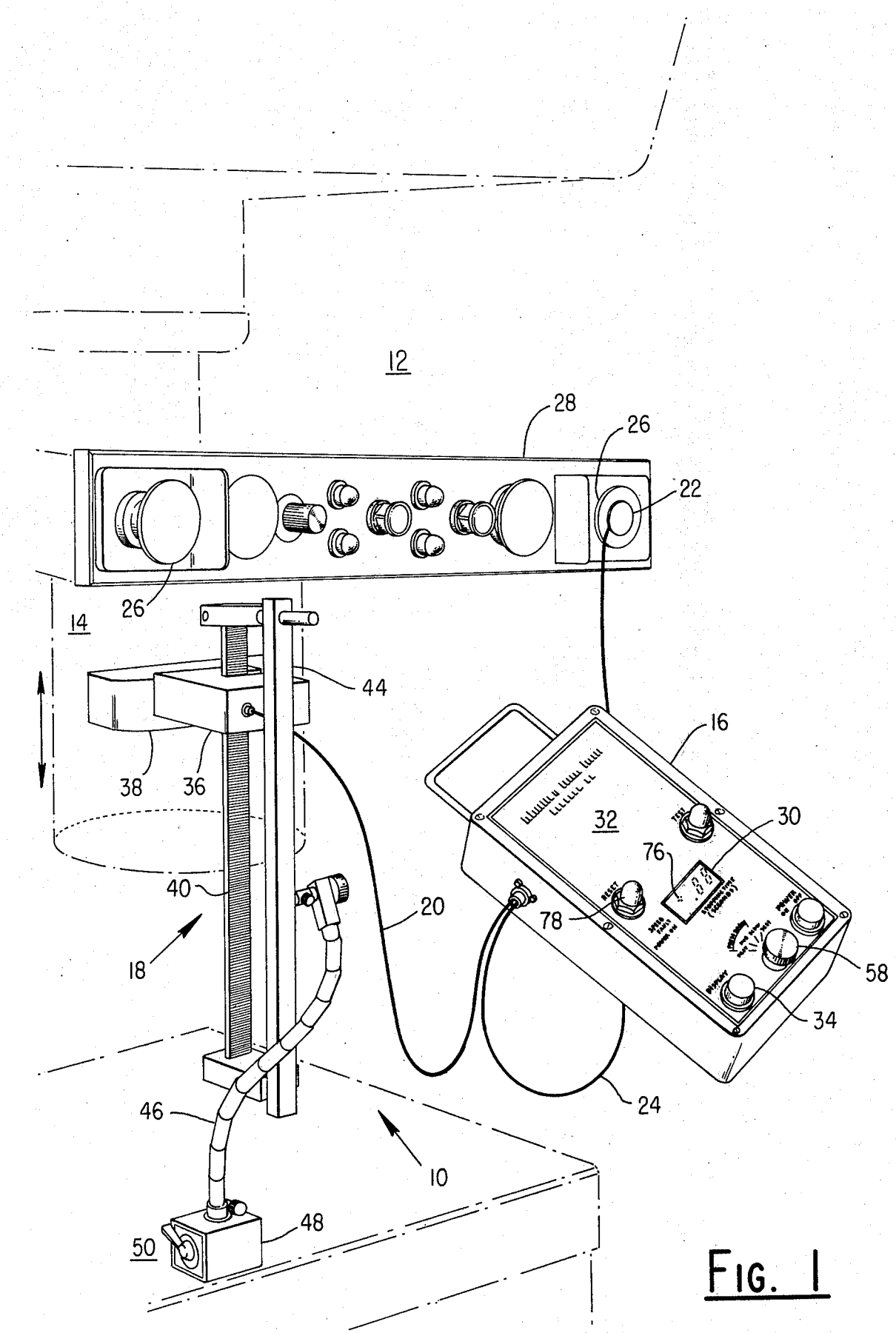
FIG. 1 depicts the use of the testing unit of the present invention to detect press ram stopping times.

Referring now to the drawings generally and FIG. 1 in particular, a testing unit 10 is shown being used on a press 12 to measure the stopping time of a movable ram 14 of the press 12.

The testing unit 10 includes electrical circuitry (not shown) contained within a hand held enclosure 16 which receives control signals from a detector assembly 18 along an electrical conductor 20 and from a touch switch 22 along an electrical conductor 24. The touch switch 22 is a normally closed switch enclosed in a soft plastic case and is used to depress one of a pair of RUN switches 26 located on a control panel 28 of the press 12. Since the press 12 will run only when the RUN switches 26 are depressed and will initiate a STOP command to stop press ram 14 movement whenever the RUN switches 26 are released, a release of one of the RUN switches 26 through the touch switch 22 will establish a control signal indicative of a press 12 STOP command to the circuitry in the enclosure 16. As will be seen later that circuitry initiates a count whenever the RUN switch 26 is released through the touch switch 22. This count is stopped when the detector assembly 18 establishes a control signal to the circuitry indicative of a stationary ram 14 position. The stored count may be displayed on a two digit digital readout 30 mounted on a face 32 of the enclosure 16 by depressing a display button 34.

The movement of the ram 14 is monitored by the detector assembly 18. The detector assembly 18 includes a sensor head 36 having a spaced light emitter 37 and detector 39, as may be seen in FIG. 3. The sensor head 36 is magnetically mounted to the ram 14 by a magnet 38 to move with the ram 14. A stationary grid 40 is located in a space formed in the sensor head 36 to provide alternate areas of light transmitting and non-transmitting material between the emitter 37 and the detector 39 as the sensor head 36 moves along the grid 40. The grid 40 is mounted to a support bracket 44. The bracket 44 is retained in the path of the sensor head 36 by a semi-rigid member 46 extending from a magnetic base 48. The member 46 is formed from known material which may be bent into various configurations which will be retained until a new configuration is forced upon it. The magnetic base 48 is magnetically attached to a press bed 50 and the member 46 is then bent, as shown, to the desired configuration allowing the grid 40 to be located along the path of ram 14 and sensor head 36 movement.

Figure 2:
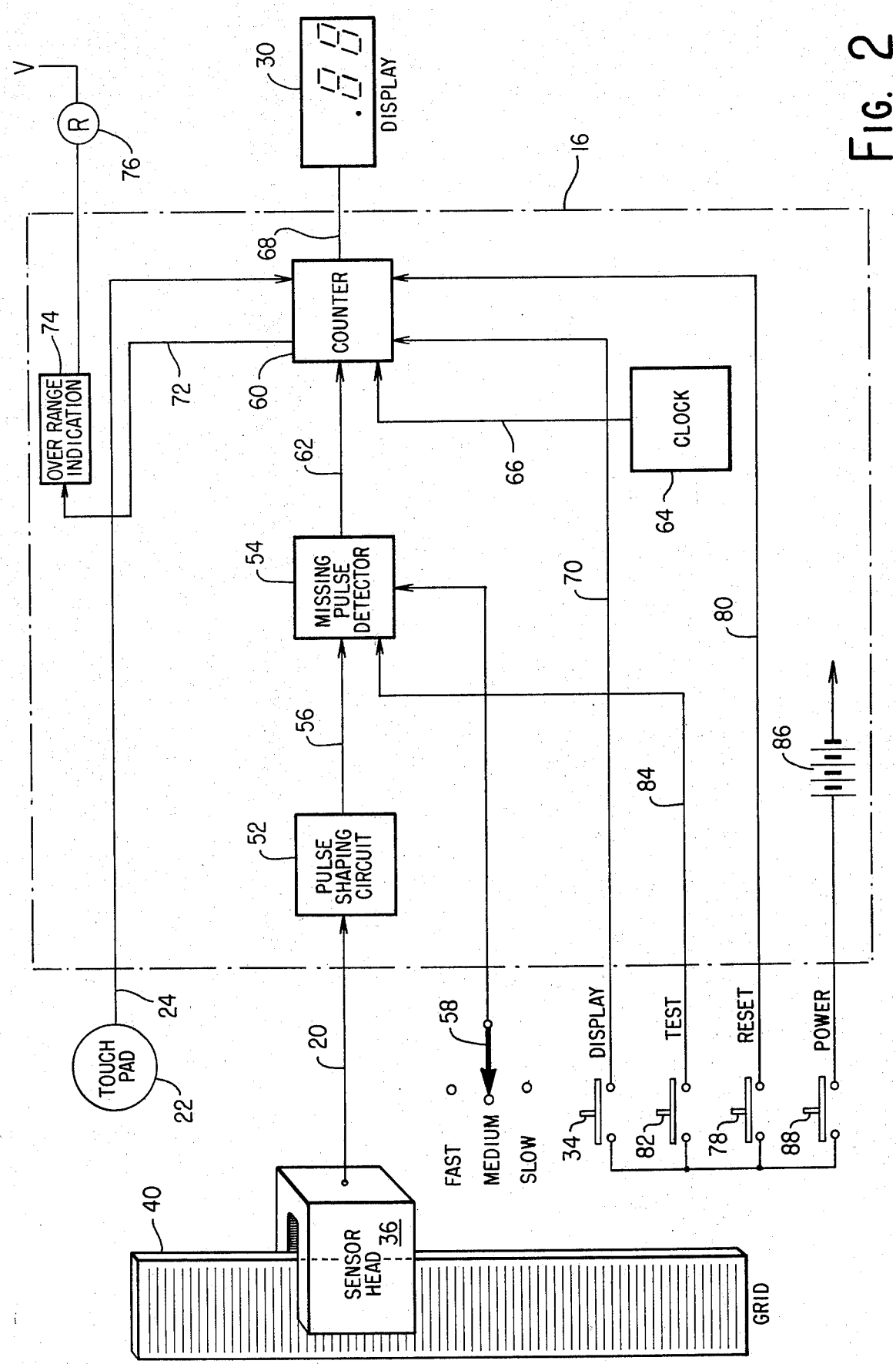
FIG. 2 is a schematic block diagram of the testing unit of FIG. 1.

Turning now to FIGS. 2, 3, and 4 it may be seen that as the sensor head 36 moves along the grid 40 the light from the emitter 37 of the sensor head is intermittently prevented from reaching the detector 39. Since the detector 39 is conductive only when light reaches it, the detector establishes a signal train whose frequency is determined by the speed of ram 14 movement. This signal train is transmitted along line 20 to a pulse shaping circuit 52 which converts the signal train to a pulse train and conducts the pulse train to a missing pulse detector circuit 54 along a line 56. The detector circuit 54 compares the time between pulses received from the shaping circuit 52 against a selected time interval set by the switch 58. As long as the time between pulses is less than the preselected time a constant high level signal is transmitted to a counter 60 along line 62 indicative of press ram 14 movement. When the time between pulses exceeds the preselected time a constant low level signal is transmitted to the counter 60 indicative of a ram 14 stationary position. The counter 60 is responsive to the forementioned signals as well as the signals from the touch switch 22 to initiate and stop count signals from a clock 64 along line 66. Specifically when the touch switch 22 signals that the press RUN switch 26 has been released to initiate the press STOP command, the count from the clock 64 is initiated and this count is stopped only when the low signal is received from the detector 62 indicating the ram 14 has stopped. Depressing the display switch 34 sends a control signal along line 70 to the counter 60 to transmit the stored count along line 68 to the digital readout 30. Should the stored count exceed the storage capacity of the counter 60 a control signal is established by the counter 60 along line 72 to an overrange circuit 74 which actuates a warning light 76 located proximate to the digital readout 30.

The circuit also has other features. The counter 60 may be manually reset by depressing a button buttion 78 to establish a control signal along line 80 to the counter 60. The range of the time interval selected by the switch 58 may be checked by depressing a switch 82 which sends a control signal along line 84 to the detector 54 to enable the counter 60 to count the time preselected.

As was mentioned earlier, the present device is self-contained and has a battery 86 within the enclosure 16 to provide a constant voltage V to power the forementioned circuitry. The battery 86 is connected to the circuitry by depressing a button 88.

The detailed operation of the testing unit 10 may be best understood with particular reference to FIGS. 3 and 4.

Once the unit 10 is set up as indicated in FIG. 1 the reset button 78 is pushed to reset the circuitry making it ready for the testing cycle. Depressing the reset button 78 sends a high signal along line 80 to a pair of decade counters 90 and 92 by way of lines 94 and 96 to clear the counters 90 and 92. The same high signal is also transmitted along lines 98 and 100 to set a pair of flip-flops 102 and 104. The output of the flip-flop 102 is connected to the enable inputs of the decade counters 90 and 92 by lines 106, 108, and 110 while the output of the flip-flop 104 is connected to the over-range circuit 74 through line 112. Since the normal set state of the flip-flops 102 and 104 is low, the circuitry connected thereto is unaffected by the setting of the flip-flops 102 and 104.

The unit 10 is now ready for the test cycle. The normally closed touch switch 22 is used to depress the RUN button 26 causing the touch switch 22 to open and causing ram 14 to move and a pulse train to be formed by the sensor head 36. The open condition of the touch switch 22 causes the line 24 to go high with this signal being transmitted to an inverter 112 which changes the signal to low and transmits the low signal along lines 80, 94, and 96 to the decade counters 90 and 92 which allows them to count. The high condition of line 24 is also transmitted by line 100 to the flip-flops 102 and 104 which remain set since no change from the reset signal was affected. Thus depressing the touch switch 22 after manual reset has caused only a redundancy of the reset function. If the reset had not been earlier affected an automatic reset would have been caused by the depression of the touch switch 22.

The pulse train established by the moving ram 14 is meanwhile causing the output of the detector 54 to maintain a high signal along line 62 until the ram 14 stops, as will be explained later. This high signal is transmitted to an inverter 114 which changes the signal to low and transmits the low signal along line 116 to a NOR gate 118 also connected to the clock 64. The effect of this signal is to enable the NOR gate 118 to pass the pulsating clock 64 signal along line 120 to a frequency divider 122 which scales down the clock 64 timing signals and transmits them to the decade counter 90 along line 124 whenever the counter 90 is in the enabled condition.

To initiate a press STOP condition the RUN switch 26 is released through the touch switch 22. This causes the touch switch 22 to return to its normally closed condition and causes the line 24 to now go low. This line 24 low condition is transmitted as a pulse to the inverter 112 causing a high pulse on lines 80, 94, and 96 and a resetting of the decade counters 90 and 92.

The low condition of line 24 is also transmitted to the flip-flops 102 and 104 removing the reset. The counter 90 begins counting to ten and transmitting a signal to the counter 92 along line 126 for every decade count. This counting by the counters 90 and 92 continues until either the line 62 goes low, indicating that the ram 14 has stopped, or until the count exceeds the capacity of the counters 90 and 92. Should the counter 92 exceed ten it then transmits a signal along line 128 to provide a warning. The signal from counter 92 is transmitted to the flip-flop 104 causing it to establish a high output along line 112. The over-range circuit 74 includes an inverter 130 which changes the high signal to low and lights the warning light 76.

As was mentioned the count is maintained until the line 62 goes low. When the line 62 goes low, the inverter 114 causes the line 116 to go high thereby forcing the NOR gate 118 to maintain a constant low output for any high or low signal from the clock 64. The NOR gate 118 thus switches the clock 64 OFF when the ram 14 stops moving. The count stored in the decade counters 90 and 92 is transmitted to the display 30 upon receipt of a high signal along line 70 by the counter 90. This signal is also transmitted by the counter 90 to the counter 92 along line 132.

As was also mentioned, the line 62 stays high as long as the ram 14 is moving and goes low when the ram 14 stops. In general, this is accomplished by shaping a proper pulse train in the circuit 52 and then using this shaped pulse train to discharge a preset RC timing circuit of the detector 54 before it can reach a level wherein it can switch a timer flip-flop circuit.

Reviewing this in detail, the pulse shaping circuit 52 has as its input the signal train established by the sensor head 36. To square off the signals the train is passed through an inverter 134 which establishes a substantially square wave along line 136. This square wave is then split along lines 138 and 140 each having a known one-shot multivibrator therein composed of similar resistors R, capacitors C and clamping diodes 142. These oneshot multivibrators change the square waves to pulse trains. The line 140 also has a NOR gate 144 which causes a 180° phase shift between the square waves transmitted along line 138 and line 140. This phase shift is then maintained between the pulse trains transmitted by the shaping circuit 52 to the detector circuit 54.

The detector circuit 54 utilizes the two phase shifted pulse trains as inputs of a NOR gate 146. Since the pulse trains are 180° out of phase the NOR gate 146 establishes a square wave output along line 148 substantially twice the frequency of the incoming pulse trains. This is done to improve the resolution of the testing instrument 10. The output of the NOR gate 146 is passed through another known one-shot multivibrator including a resistor R, capacitor C, and clamping diode 142 to provide a negative pulse train to a timer 149 along input 150 proportional to the speed of the ram 14. The timer 149 has another input 152 along which a wave train is formed by the RC circuit selected through the switch 58. The switch 58 is shown connected to a resistor 154 through which the voltage V charges the capacitor 156. The charging time of capacitor 156 is usually determined by the RC constant of the elements. However since the capacitor 156 is also connected by line 158 and diode 160 to input 150 it will discharge whenever the pulse train along line 150 is low. Thus the voltage level to which the capacitor will charge is determined by the time period the pulse train established along line 150 remains low.

The timer 149 has a comparator 162 which compares the voltage level of the pulse train along line 150 with a constant voltage level established by a three resistor voltage divider 164 which divides the voltage V into three substantially equal parts. A line 166 is connected across one of the resistors to provide a V/3 voltage base. The comparator 162 establishes a signal along line 168 to set a flip-flop 170 to have a high output along line 62 whenever the pulse train voltage along line 150 goes below V/3. Thus when the ram 14 starts moving and the pulse train is established, the comparator 162 sets the flip-flop 170 to establish a high output. This high output is maintained until a signal is received by the flip-flop 170 along line 172 from a comparator 174 to flop the flip-flop 170 making it go low. The comparator 174 will establish such a signal when the voltage on the capacitor 156 exceeds the 2V/3 level established by the connection of the comparator 174 to the voltage divider 164 along line 176. Thus the flip-flop 170 will be set to go high when the first pulse train is set up along line 150 and will be reset to go low only when the space between pulses of the pulse train along line 150 is long enough to allow the capacitor to charge to a 2V/3 level. This space between pulses is correlated to ram 14 speed to insure that the ram 14 speed is so slow that the ram 14 is practically in stopped position.

Certain modifications and improvements will occur to those skilled in the art upon consideration of this application. It will be understood that such modifications and improvements have been deleted for the sake of conciseness and readability but are properly within the scope of the following claims.

What we claim is:

1. Testing apparatus for determining the stopping time of a movable member after initiation of a stop signal to the driving mechanism of the movable member comprising:
   photoelectric means for determining the moving and stationary condition of the movable member and establishing signals indicative thereof including a detector assembly having a light emitter spacedly located from a light detector mountable to the movable member to be movable therewith, and a stationary grid member mounted in the space between the light emitter and light detector of said detector assembly to intermittently prevent light from the emitter from reaching the detector as said detector assembly moves along said stationary grid member;
   switch means for detecting the initiation of the stop signal to the driving mechanism and establishing a control signal indicative thereof; and
   circuit means responsive to said switch means to initiate counting in response to the control signal from said switch means and responsive to said photoelectric means to stop counting in responsive to signal from said photoelectric means indicative of the stationary condition of the movable member.

2. Testing apparatus as set forth in claim 2, wherein said switch means includes a normally closed touch switch enclosed in a flexible pad mountable against a control switch for establishing the stop signal, said touch switch changing to an open circuit condition whenever said control switch is pressure actuated through said touch switch.

3. Testing apparatus as set forth in claim 2 wherein said circuit means includes:
- a pulse shaping circuit connected to said detector assembly to convert signals from said detector assembly into pulses;
- pulse detecting circuit connected to said pulse shaping circuit to compare the pulse durations of said pulse detecting circuit against a predetermined time interval and establish control signals indicative of the pulse duration exceeding the predetermined time interval; and
- a counter circuit responsive to said pulse detecting circuit to respond to said control signal from said pulse detecting circuit to stop the count in said counter circuit, said counter circuit also being responsive to said touch switch to start the count whenever said touch switch is actuated.

4. A testing apparatus for determining the stopping time of a press ram after initiating a press STOP condition comprising:
- a press control button for initiating a press STOP condition;
- a touch switch for actuating said press control button to establish a control signal indicative of the initiation of the press STOP condition whenever said press button is actuated through said touch switch;
- photoelectric means for monitoring the speed of the press ram and establishing a signal train indicative thereof;
- circuit means responsive to the signal train of said photo-electric means to establish a first control signal indicative of a moving press ram condition and a second control signal indicative of a substantially stationary press ram condition; and
- counting means responsive to the control signal from said touch switch and the first control signal from said circuit means to start counting the stopping time and responsive to said second control signal from said circuit means to stop counting the stopping time to thereby establish the stopping time of the press ram.

5. A testing apparatus as set forth in claim 4 wherein said photoelectric means includes:
- a light emitter;
- a light detector spacedly located from said light emitter;
- an elongated grid member located to intermittently block said light detector from said light emitter as the press ram is moving.

6. A testing apparatus as set forth in claim 5 wherein said light emitter and detector are mounted to the press ram to be movable therewith and wherein said grid member is stationarily mounted between said light emitter and detector.

7. A testing apparatus as set forth in claim 6 wherein said circuit means includes a pulse detecting circuit for comparing the pulse intervals of signal train with a predetermined interval to establish the first control signal whenever the pulse intervals are less than the predetermined interval and to establish the second control signal whenever the pulse train intervals are greater than the predetermined intervals.

8. A testing apparatus as set forth in claim 7 wherein said counting means includes a counter connected to a clock through a switch means and wherein said switch means is responsive to the first control signal of said detecting circuit to pass signals from said clock to said counter and is responsive to the second control signal of said detecting circuit to block signals from said clock to said counter.

9. A testing apparatus as set forth in claim 8 wherein said counter is responsive to the control signal from said touch switch to accept signals from said switch means.

* * * * *

UNITED STATES PATENT OFFICE
CERTIFICATE OF CORRECTION

PATENT NO. : 3,993,898
DATED : November 23, 1976
INVENTOR(S) : SURINDER SINGH GULIANI, ET AL It is certified that error appears in the above-identified patent and that said Letters Patent are hereby corrected as shown below:

Abstract Page, change Assignee from "Babcock & Wilcox Limited" to -- Babcock & Wilcox, New York, N. Y. --

Column 2 line 26, change "a" to -- the --.

Column 4 line 2, change "button button" to -- reset button --.

Claim 1 line 59 change "responsive" to -- response --.

Claim 1 line 59 after "response to" add -- the --.

Claim 2 line 62 change "2" to -- 1 --.

Claim 4 line 26 before the word "button" insert -- control --.

Signed and Sealed this

Twelfth Day of April 1977

[SEAL]

Attest:

RUTH C. MASON
*Attesting Officer*

C. MARSHALL DANN
*Commissioner of Patents and Trademarks*